US012398997B2

(12) United States Patent
Sood et al.

(10) Patent No.: US 12,398,997 B2
(45) Date of Patent: Aug. 26, 2025

(54) IDENTIFYING A CUVETTE FOR MEASURING LIGHT SCATTERING OF A SAMPLE

(71) Applicant: Wyatt Technology, LLC, Goleta, CA (US)

(72) Inventors: Siddharth Sood, Ventura, CA (US); Howard Friedenberg, Santa Barbara, CA (US)

(73) Assignee: Wyatt Technology, LLC, Goleta, CA (US)

(*) Notice: Subject to any disclaimer, the term of this patent is extended or adjusted under 35 U.S.C. 154(b) by 190 days.

(21) Appl. No.: 17/964,907

(22) Filed: Oct. 12, 2022

(65) Prior Publication Data
US 2023/0115994 A1     Apr. 13, 2023

Related U.S. Application Data

(60) Provisional application No. 63/255,007, filed on Oct. 12, 2021.

(51) Int. Cl.
G01B 11/24     (2006.01)
G01N 21/03     (2006.01)
G01N 21/47     (2006.01)

(52) U.S. Cl.
CPC ............ *G01B 11/24* (2013.01); *G01N 21/03* (2013.01); *G01N 21/47* (2013.01); *G01N 2021/0378* (2013.01)

(58) Field of Classification Search
CPC ........ G01B 11/24; G01N 21/03; G01N 21/47; G01N 2021/0378
See application file for complete search history.

(56) References Cited

U.S. PATENT DOCUMENTS 6,358,471 B1 * 3/2002 Ishihara ............... G01N 35/04
                                                          422/549
2014/0146313 A1 * 5/2014 Trainoff ................ G01N 21/03
                                                          356/246

(Continued)

FOREIGN PATENT DOCUMENTS

CN     209560376 U  * 10/2019  ............. G01N 35/00
CN     217505895 U  *  9/2022  ............. G01N 35/02
EP       3390935 B1     2/2022

OTHER PUBLICATIONS

International Search Report and Written Opinion in PCT/US2023/028759 mailed on Jan. 19, 2024.

(Continued)

Primary Examiner — Jamil Ahmed
(74) Attorney, Agent, or Firm — Schmeiser, Olsen & Watts LLP

(57) ABSTRACT

The present disclosure describes an apparatus, method, system, and computer program product of identifying a cuvette for measuring light scattering of a sample. In an exemplary embodiment, the apparatus includes at least one sensor configured to detect at least one shape feature of a cuvette, and an insulating block configured to maintain a temperature of the at least one sensor within an operating temperature range of the at least one sensor. In an exemplary embodiment, the method, system, and computer program product include receiving a first set of signals from a first sensor directed to a cuvette, receiving a second set of signals from a second sensor directed to the cuvette, and executing a set of logical operations detecting a shape feature of the cuvette.

20 Claims, 10 Drawing Sheets

(56) References Cited

U.S. PATENT DOCUMENTS

2017/0176069 A1* 6/2017 Lundberg .............. F25B 43/006
2021/0255039 A1* 8/2021 Morgan, III .............. G01J 3/42

OTHER PUBLICATIONS

Invitation to Pay Additional Fees in PCT/US2023/028759 mailed on Nov. 6, 2023.
International Preliminary Report on Patentability in PCT/US2023/028759 mailed on Apr. 24, 2025.

* cited by examiner 520 520

| Cell | CellID | A | B |
|---|---|---|---|
| Disp01 | 3 | 201 | 744 |
| Disp01 | 3 | 201 | 744 |
| Disp01 | 3 | 202 | 746 |
| Disp02 | 3 | 200 | 713 |
| Disp02 | 3 | 201 | 711 |
| Disp02 | 3 | 201 | 714 |
| None | 0 | 195 | 297 |
| None | 0 | 195 | 297 |
| None | 0 | 195 | 297 |
| None | 0 | 195 | 297 |
| None | 0 | 195 | 297 |
| Q1 | 2 | 588 | 356 |
| Q1 | 2 | 588 | 357 |
| Q1 | 2 | 588 | 356 |
| Q2 | 2 | 621 | 293 |
| Q2 | 2 | 621 | 292 |
| Q2 | 2 | 620 | 292 |
| COTS2 | 6 | 684 | 1756 |
| COTS2 | 6 | 684 | 1748 |

FIG. 5C

IDENTIFYING A CUVETTE FOR MEASURING LIGHT SCATTERING OF A SAMPLE

PRIORITY

This application claims priority to U.S. Provisional Patent Application No. 63/255,007, filed Oct. 12, 2021.

BACKGROUND

The present disclosure relates to light scattering, and more specifically, to identifying a cuvette for measuring light scattering of a sample.

SUMMARY

The present disclosure describes an apparatus, a computer implemented method, a system, and a computer program product of identifying a cuvette for measuring light scattering of a sample. In an exemplary embodiment, the apparatus includes (1) at least one sensor configured to detect at least one shape feature of a cuvette, where the cuvette is configured to contain a sample, where the at least one sensor is located a distance from a receptacle configured to contain the cuvette, and (2) an insulating block configured to maintain a temperature of the at least one sensor within an operating temperature range of the at least one sensor. In an exemplary embodiment, the computer implemented method, the system, and the computer program product include (1) receiving, by a computer system, a first set of signals from a first sensor directed to a cuvette, where the cuvette is configured to contain a sample, (2) receiving, by the computer system, a second set of signals from a second sensor directed to the cuvette, and (3) executing, by the computer system, a set of logical operations detecting a shape feature of the cuvette in response to at least one of (a) a value of the first set of signals exceeding a first sensor threshold of the first sensor, (b) a value of the second set of signals exceeding a second sensor threshold of the second sensor, and (c) a value of the first set of signals exceeding the first sensor threshold and a value of the second set of signals exceeding the second sensor threshold. In an exemplary embodiment, the apparatus includes at least one camera directed to a cuvette and configured to identify the cuvette.

BRIEF DESCRIPTION OF THE DRAWINGS

FIG. 5C depicts a data in accordance with an embodiment.

DETAILED DESCRIPTION

Figure 1A:
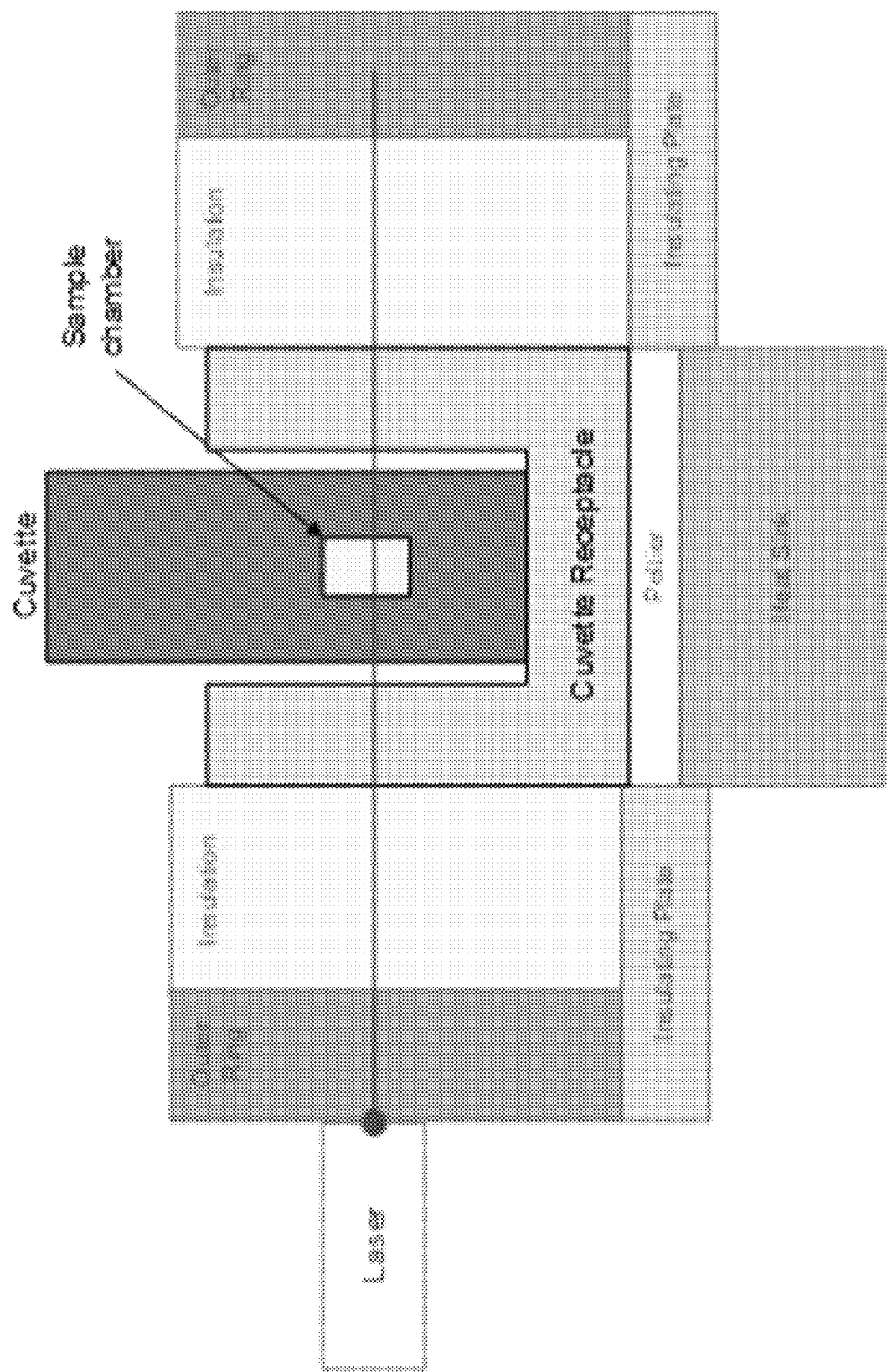
FIG. 1A depicts a prior art apparatus.

The present disclosure describes an apparatus, a computer implemented method, a system, and a computer program product of identifying a cuvette for measuring light scattering of a sample. In an exemplary embodiment, the apparatus includes (1) at least one sensor configured to detect at least one shape feature of a cuvette, where the cuvette is configured to contain a sample, where the at least one sensor is located a distance from a receptacle configured to contain the cuvette, and (2) an insulating block configured to maintain a temperature of the at least one sensor within an operating temperature range of the at least one sensor. In an embodiment, the distance ranges from 2 mm to 30 mm. For example, the distance could range from 2 mm to 20 mm. As the distance decreases, the sensitivity of the sensor increases while the area sensed by the sensor decreases. In an embodiment, the distance exceeds 30 mm where the sensor is directed to a light pipe/light channel. In an embodiment, the distance is 16.5 mm. In an embodiment, the temperature range is −40 degrees C. to 120 degrees C. For example, the temperature range could be −10 degrees C. to 120 degrees C. In an embodiment, the temperature range is −40 degrees C. to 120 degrees C., as long as no condensation is adjacent to the sensor.

In an exemplary embodiment, the computer implemented method, the system, and the computer program product include (1) receiving, by a computer system, a first set of signals from a first sensor directed to a cuvette, where the cuvette is configured to contain a sample, (2) receiving, by the computer system, a second set of signals from a second sensor directed to the cuvette, and (3) executing, by the computer system, a set of logical operations detecting a shape feature of the cuvette in response to at least one of (a) a value of the first set of signals exceeding a first sensor threshold of the first sensor, (b) a value of the second set of signals exceeding a second sensor threshold of the second sensor, and (c) a value of the first set of signals exceeding the first sensor threshold and a value of the second set of signals exceeding the second sensor threshold. In an embodiment, the signals first set of signals are a function of an angle of a surface of the cuvette with respect to the first sensor, reflectivity of the cuvette, and a distance of the first sensor to the cuvette. In an embodiment, the signals in the second set of signals are a function of an angle of a surface of the cuvette with respect to the second sensor, reflectivity of the cuvette, and a distance of the second sensor to the cuvette.

In an exemplary embodiment, the apparatus includes at least one camera directed to a cuvette and configured to identify the cuvette. For example, the camera could be a bar code reader. In an embodiment, the at least one camera is configured to identify at least one shape feature of the cuvette. In an embodiment, the at least one camera is configured to read a bar code image associated with the cuvette.

In an embodiment, the apparatus, computer implemented method, system, and computer program product identify cuvette types in a light scattering instrument based on a proximity-based non-contact sensor.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Current Technologies

Figure 1B:
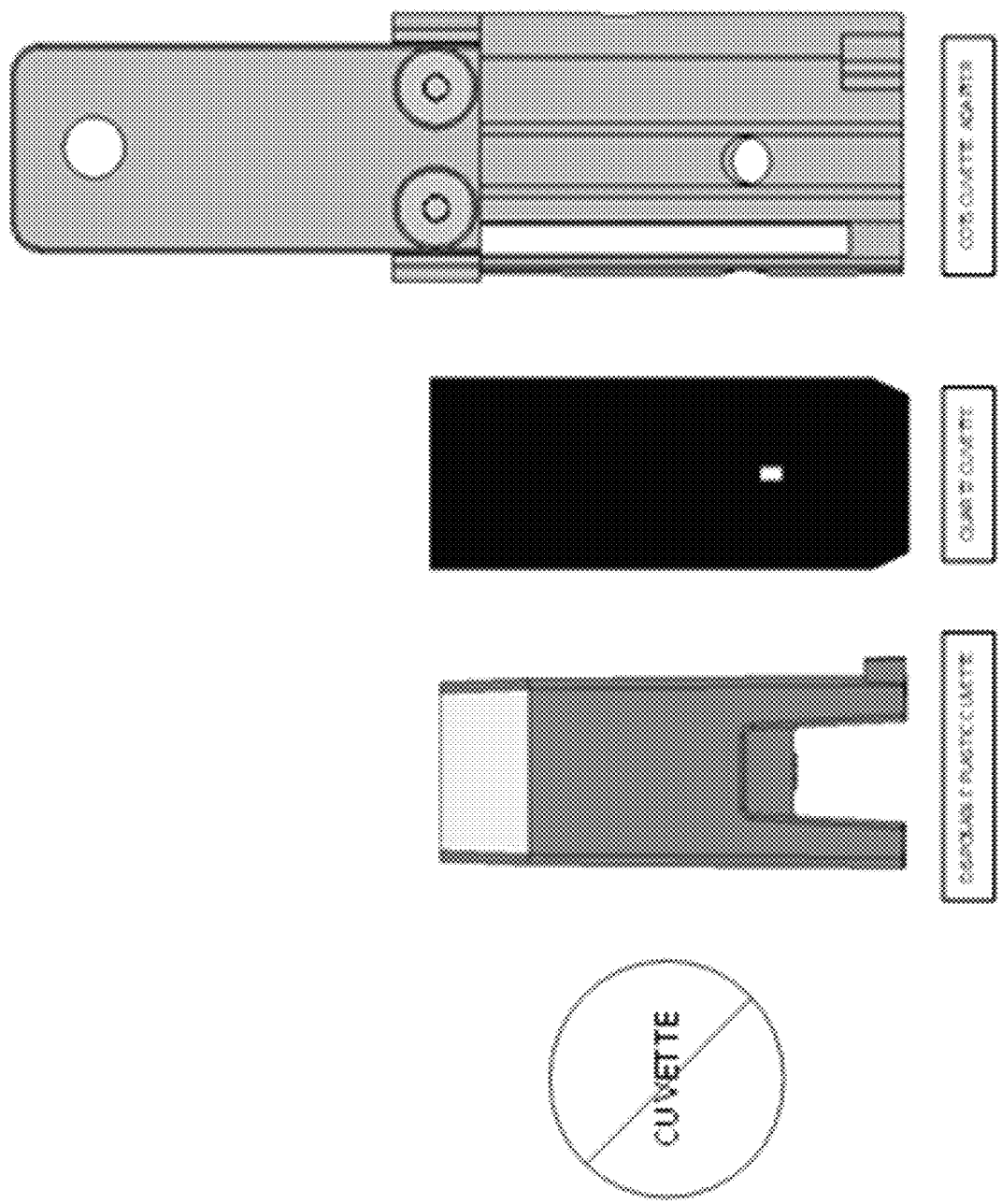
FIG. 1B depicts prior art cuvettes.

Current technologies, as depicted in prior art FIG. 1A and FIG. 1B allow for installing a cuvette in a receptacle in the instrument as shown in FIG. 1A, where the cuvette and the sample are exposed to (a) low power laser light that allow for various properties of the sample to be inferred based on scattered light measured by several detectors placed around the cuvette receptacle, and (b) a wide temperature range—(−10 C to 120 C). Since samples to be inserted into the cuvette could be prepared in corrosive solvents such as salt water, toluene, etc., current technologies allow for a reasonable probability of spills occurring in the receptacle. Current technologies could lead to inaccurate measurement of sample properties because of a need for good positioning accuracy of the cuvette (~10 microns) in the receptacle. Thus, there is a need to identify a cuvette for measuring light scattering of a sample, in a way that satisfies the following constraints: (1) withstands the full temperature range (−10 to 120 C), (2) able to survive an accidental condensation event (in the event of the user supplying non-conforming 'dry' gas during cooling), (3) not interfere with cuvette positioning, (4) not interfere with light scattering measurement (not generate stray light during measurement), (5) withstands accidental spills of potentially corrosive solvents, (6) has high reliability as the temperature limit failsafe is dependent on correct detection of the cuvette type (plastic disposable cuvette has a lower high temperature limit), (7) low cost, (8) manufacturable, and (9) serviceable.

Apparatus

Figure 2:
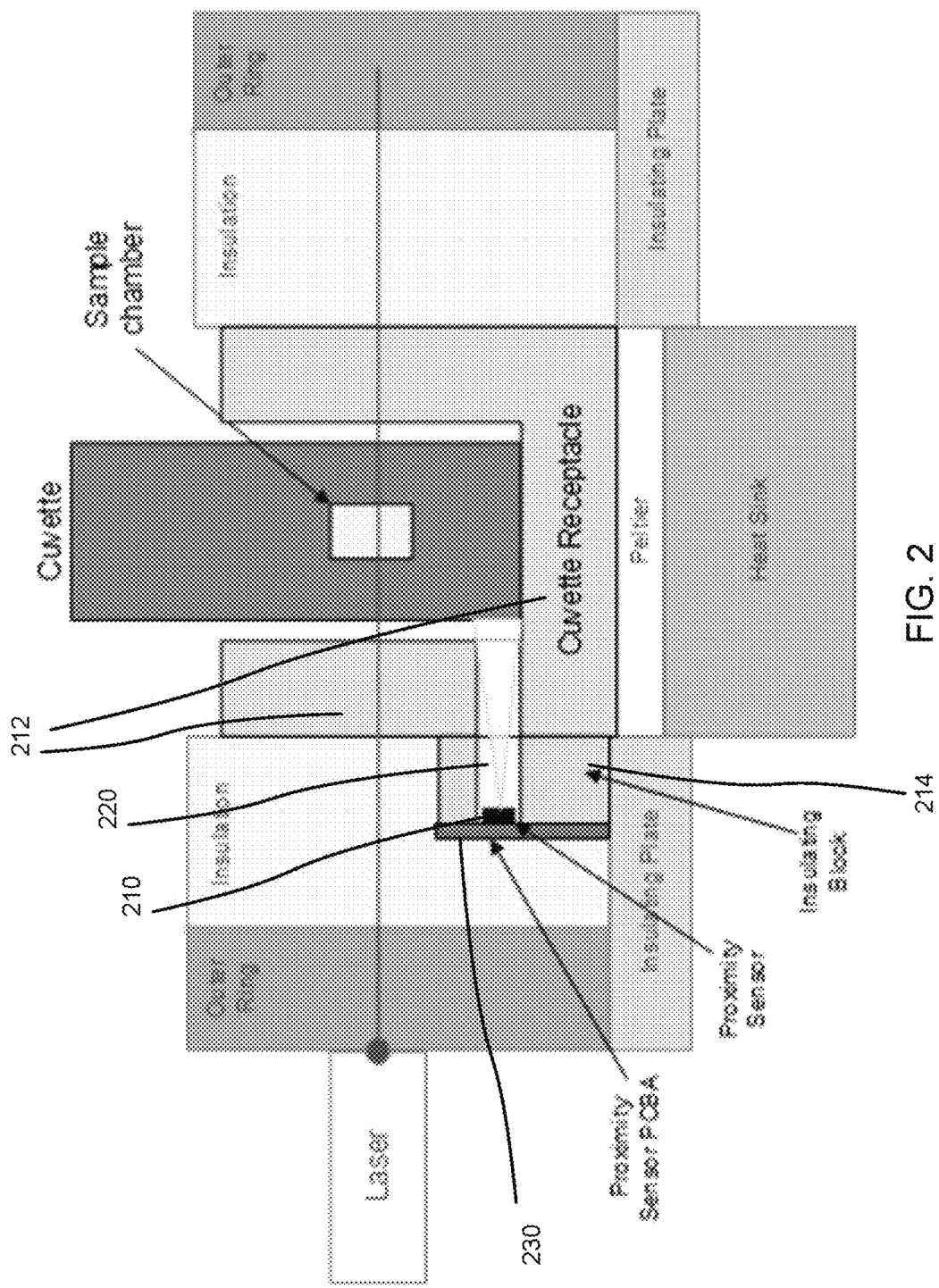
FIG. 2 depicts an apparatus in accordance with an exemplary embodiment.
Figure 3:
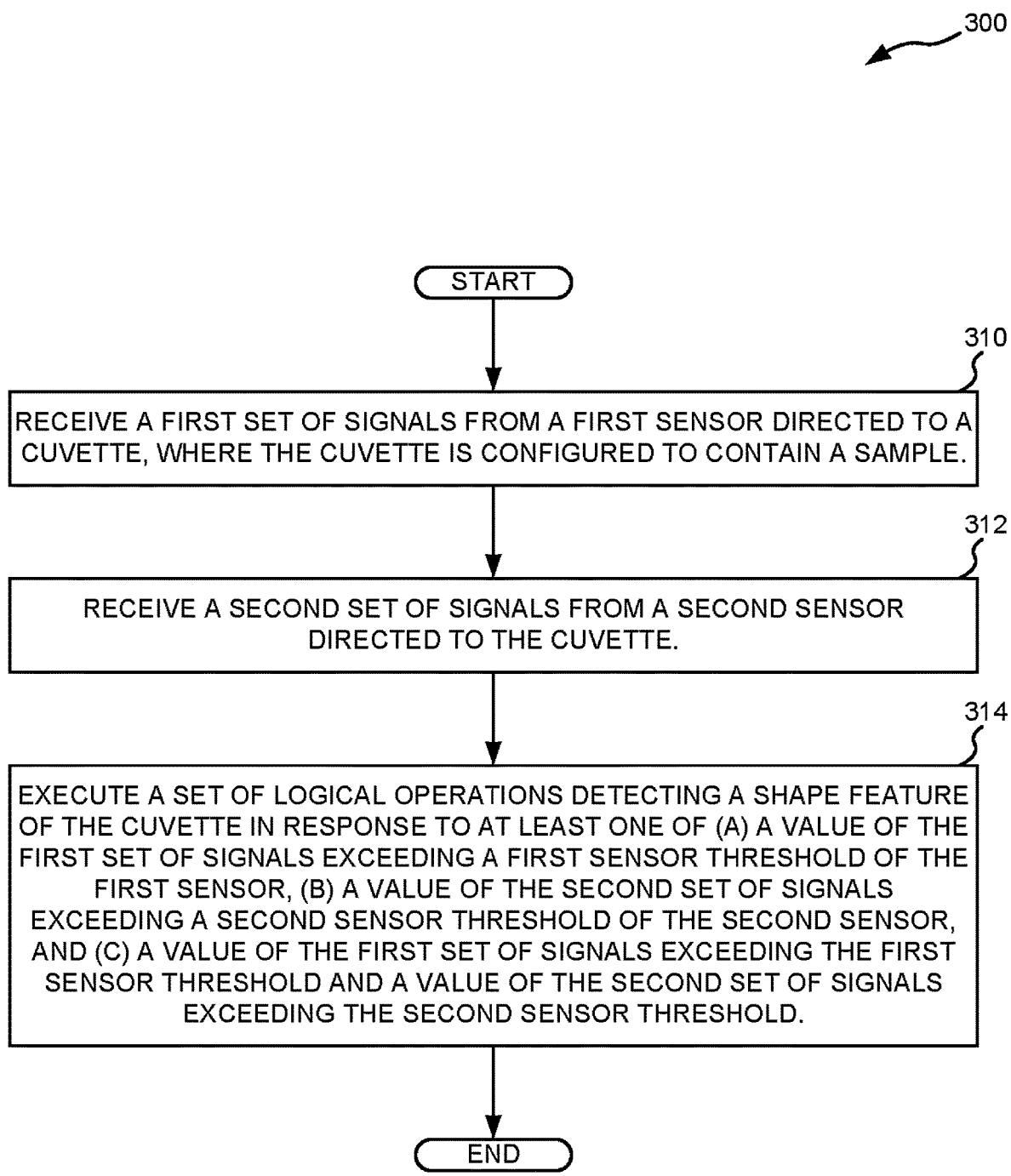
FIG. 3 depicts a flowchart in accordance with an exemplary embodiment.

Referring to FIG. 2, in an exemplary embodiment, the apparatus includes (1) at least one sensor 210 configured to detect at least one shape feature of a cuvette, where the cuvette is configured to contain a sample, where at least one sensor 210 is located a distance from a receptacle 212 configured to contain the cuvette, and (2) an insulating block 214 configured to maintain a temperature of at least one sensor 210 within an operating temperature range of at least one sensor 210. In an embodiment, sensor 210 is located a distance from receptacle 212 because receptacle 212 could reach a temperature that exceeds an operating temperature range of sensor 210.

Sensor

In an embodiment, at least one sensor 210 includes an optical sensor. For example, at least one sensor 210 could be an optical sensor. In an embodiment, the optical sensor is not dependent on the reflectivity of the cuvette. In an embodiment, the optical sensor gathers a certain amount of return signal for each type of cuvette. For example, the optical sensor could be an infrared sensor or a laser. In an embodiment, the optical sensor is directed to the at least one shape feature. For example, the optical sensor could be a line-of-sight sensor (e.g., infrared (IR) sensor, laser). In another example, the optical sensor could be directed to a light pipe (e.g., optical fiber), where the optical sensor is not a line-of-sight sensor. In an embodiment, since sensor 210 is completely non-contact, sensor 210 would not interfere with positioning of the cuvettes. For example, with sensor 210 being non-contact and sufficiently far away from the inner core of the apparatus could eliminate the possibility of a spill of fluid/sample reaching sensor 210. Also, for example, since the apparatus has no moving mechanical parts, sensor 210 could be highly reliable. In addition, with sensors having limited capability could be relatively inexpensive (~$2 each in volume).

Modes

In an embodiment, at least one sensor 210 is configured to be non-operational during a light scattering (LS) measurement of the sample. For example, where sensor 210 is an IR sensor, the IR sensor is powered off during a light scattering measurement of the sample to avoid IR emission from the IR sensor interfering with the LS measurement. In an embodiment, the sensor could be turned OFF completely during a measurement, thereby emitting no stray light in its OFF state, during a LS measurement. For example, with each sensor 210 in the array being used as ON/OFF sensor, small reflectivity variations from cuvette to cuvette could have little effect on the final sample measurements.

Light Channel

In an embodiment, at least one sensor 210 is within a light channel 220 directed to the at least one shape feature, as depicted in FIG. 2. In an embodiment, the at least one sensor is adjacent to a light channel directed to the at least one shape feature. In an embodiment, the at least one sensor is adjacent to a light pipe directed to the at least one shape feature. For example, the light pipe could be an optical fiber.

Leak Channel

Figure 4A:
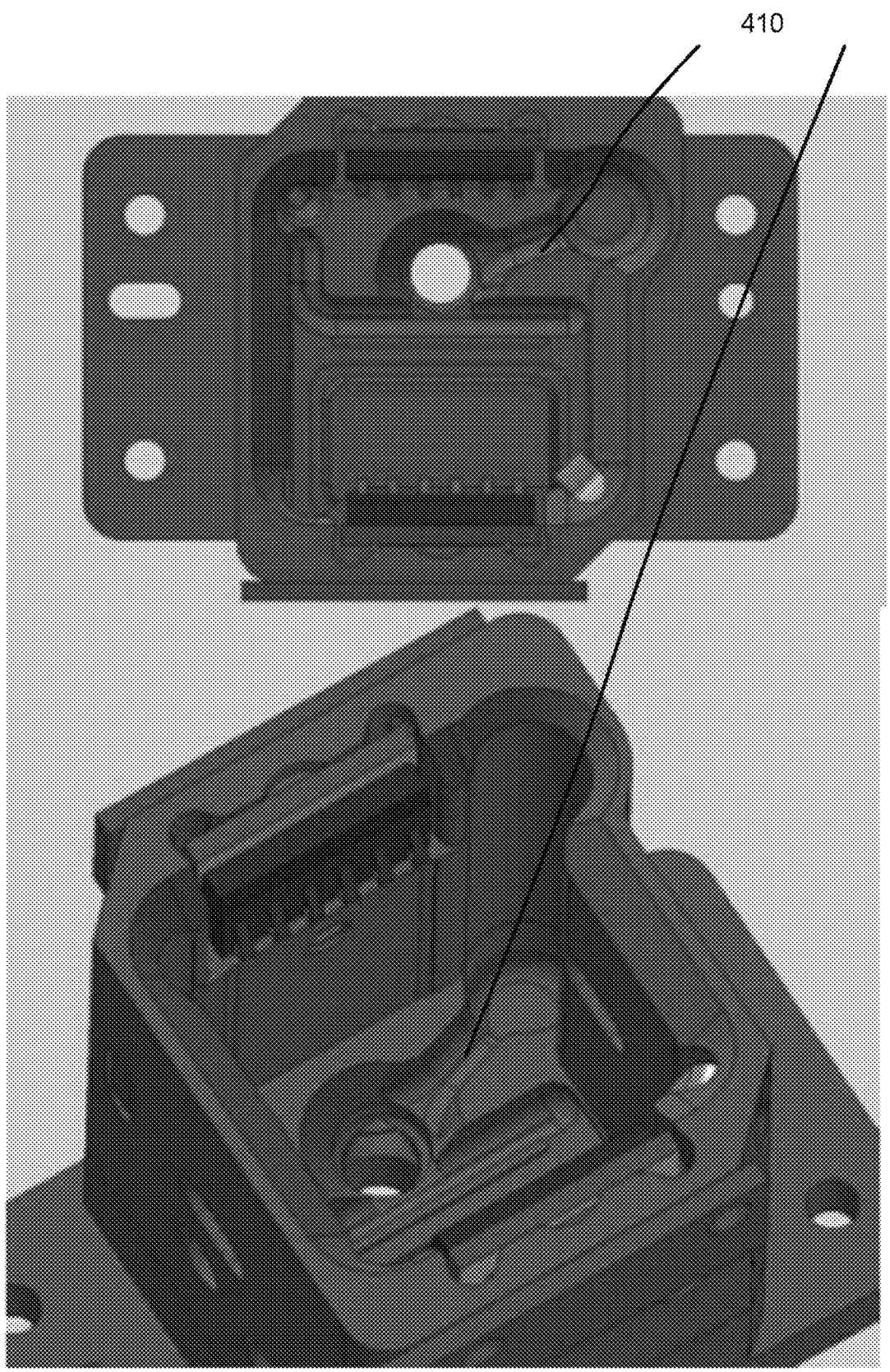
FIG. 4A depicts an apparatus in accordance with an embodiment.
Figure 4B:
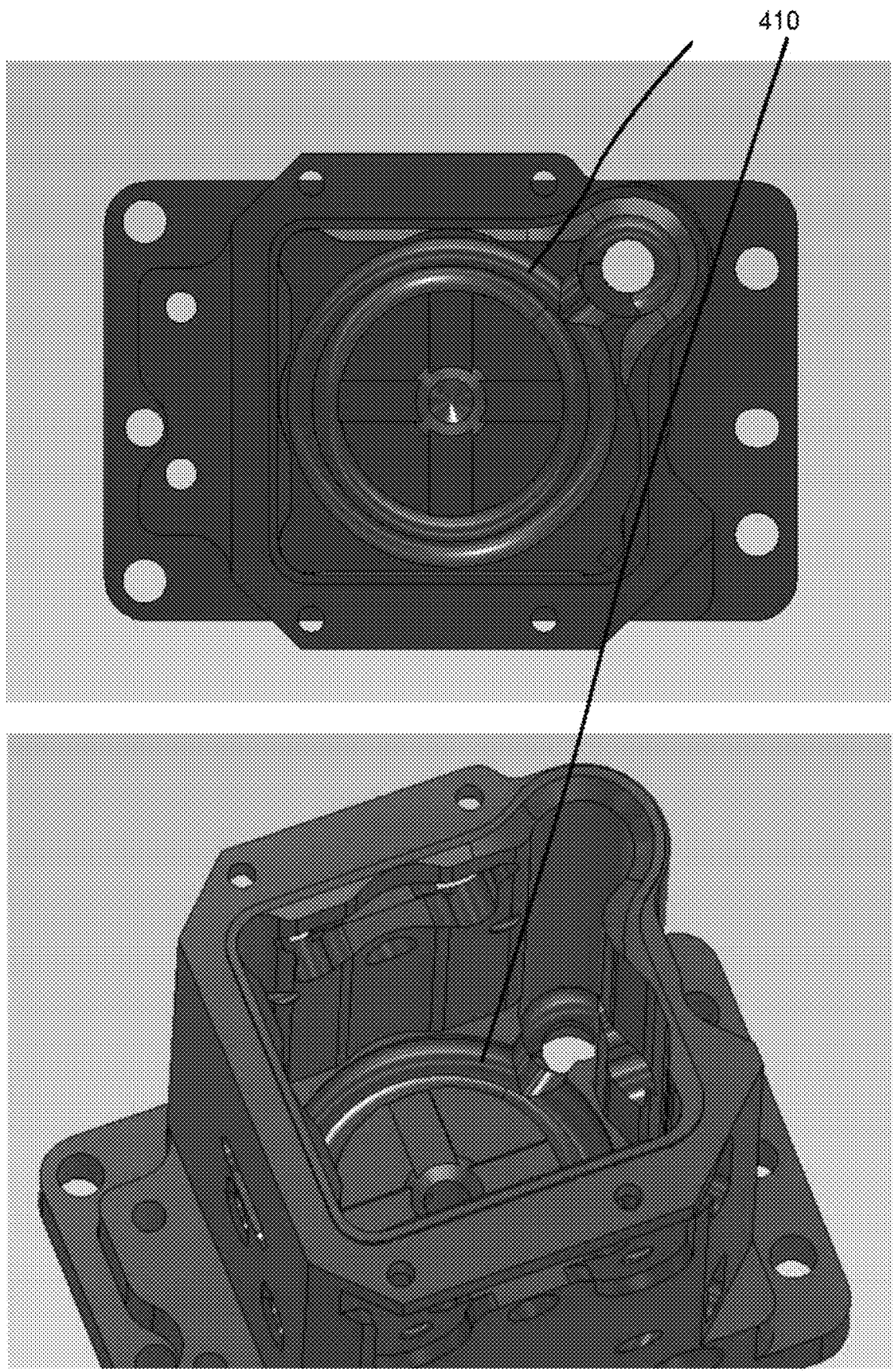
FIG. 4B depicts an apparatus in accordance with an embodiment.

Referring to FIG. 4A and FIG. 4B, in an embodiment, the receptacle includes at least one leak channel 410 configured to collect leaked fluid and configured to direct the leaked fluid to waste. For example, the leaked fluid could be fluid leaked from the apparatus. In an embodiment, leak channels 410 could help divert spill contents away from sensor 210.

Printed Circuit Board

Referring to FIG. 2, in an embodiment, at least one sensor 210 is mounted on a printed circuit board assembly 230 (PCBA). For example, sensor 210 is a surface-mount sensor that could be mounted on printed circuit board assembly 230. In an embodiment, printed circuit board assembly 230 includes a conformal coating to prevent moisture from damaging electronics in at least one sensor 210. For example, the conformal coating could be an environmental moisture barrier that prevents a moist environment from condensation in the cuvette from damaging electronics in sensor 210.

In an embodiment, printed circuit board assembly 230 further includes a relative humidity (RH) sensor to detect a humidity level beyond a limit. For example, the RH sensor could protect the apparatus and/or an instrument including the apparatus, from condensation. In an embodiment, printed circuit board assembly 230 is connected to the insulating block 214. For example, printed circuit board assembly 230 could be removed from an optical bench including receptacle 212 without disturbing an optical alignment of the optical bench. Since sensor 210 is a non-contact sensor, insulating block 214 could be removed without disturbing the optical alignment of the optical bench.

In an embodiment, sensor array 210 on printed circuit board assembly 230 is mounted to receptacle 212 with a thermal isolator 214, thereby allowing the apparatus to withstands the full temperature range (−10 to 120 C). With a sufficiently thick insulating block and air gap, the temperature of proximity sensor 210 could be kept within its operating temperature limits. Moreover, as cuvette detection is only required when a cuvette is installed/removed (at room temperature), sensors 210 could also be turned OFF during instrument heating/cooling.

In an embodiment, printed circuit board assembly 230 is protected from condensation with a conformal coating. Moreover, printed circuit board assembly 230 could also include an RH sensor, which could offer further protection against occurrence of a condensation event by detecting a non-conforming 'dry' gas supply before cooling begins. In addition, for example, printed circuit board assembly 230 could be removed easily from the inner chamber of the apparatus without affecting the optical alignment of the apparatus, thereby avoiding spending time fixing the optical alignment of the apparatus.

Method, System, and Computer Program Product

In an exemplary embodiment, the computer implemented method, the system, and the computer program product are configured to perform an operation 310 of receiving, by a computer system, a first set of signals from a first sensor directed to a cuvette, where the cuvette is configured to contain a sample, an operation 312 of receiving, by the computer system, a second set of signals from a second sensor directed to the cuvette, and an operation 314 of executing, by the computer system, a set of logical operations detecting a shape feature of the cuvette in response to at least one of (a) a value of the first set of signals exceeding a first sensor threshold of the first sensor, (b) a value of the second set of signals exceeding a second sensor threshold of the second sensor, and (c) a value of the first set of signals exceeding the first sensor threshold and a value of the second set of signals exceeding the second sensor threshold (e.g., COTS (1 unit)). In an embodiment, the sets of signals are binary readings/numbers.

Figure 6:
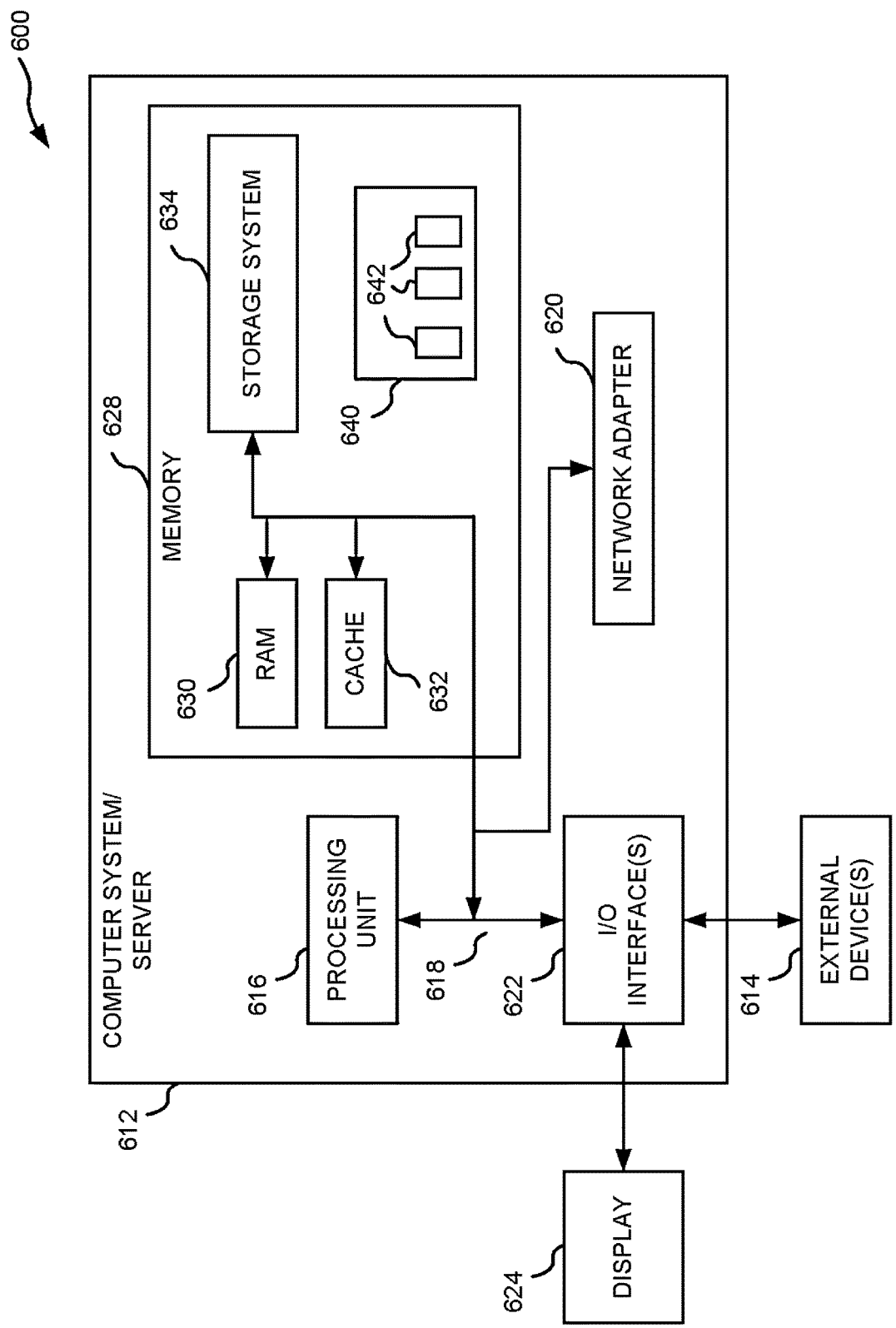
FIG. 6 depicts a computer system in accordance with an exemplary embodiment.

In an exemplary embodiment, the computer system is a standalone computer system, such as computer system 600 shown in FIG. 6, a network of distributed computers, where at least some of the computers are computer systems such as computer system 600 shown in FIG. 6, or a cloud computing node server, such as computer system 600 shown in FIG. 6. In an embodiment, the computer system is a computer system 600 as shown in FIG. 6, that executes an identifying a cuvette for measuring light scattering of a sample script or computer software application that carries out the operations of at least method 300. In an embodiment, the computer system is a computer system/server 612 as shown in FIG. 6, that executes an identifying a cuvette for measuring light scattering of a sample script or computer software application that carries out the operations of at least method 300. In an embodiment, the computer system is a processing unit 616 as shown in FIG. 6, that executes an identifying a cuvette for measuring light scattering of a sample script or computer software application that carries out the operations of at least method 300. In an embodiment, the computer system is a machine learning computer software/program/algorithm that executes an identifying a cuvette for measuring light scattering of a sample script or computer software application that carries out the operations of at least method 300.

In an embodiment, the computer system is a computer system 600 as shown in FIG. 6, that executes an identifying a cuvette for measuring light scattering of a sample script or computer software application that carries out at least operations 310, 312, and 314. In an embodiment, the computer system is a computer system/server 612 as shown in FIG. 6, that executes an identifying a cuvette for measuring light scattering of a sample script or computer software application that carries out at least operations 310, 312, and 314. In an embodiment, the computer system is a processing unit 616 as shown in FIG. 6, that executes an identifying a cuvette for measuring light scattering of a sample script or computer software application that carries out at least operations 310, 312, and 314.

Example

Figure 5A:
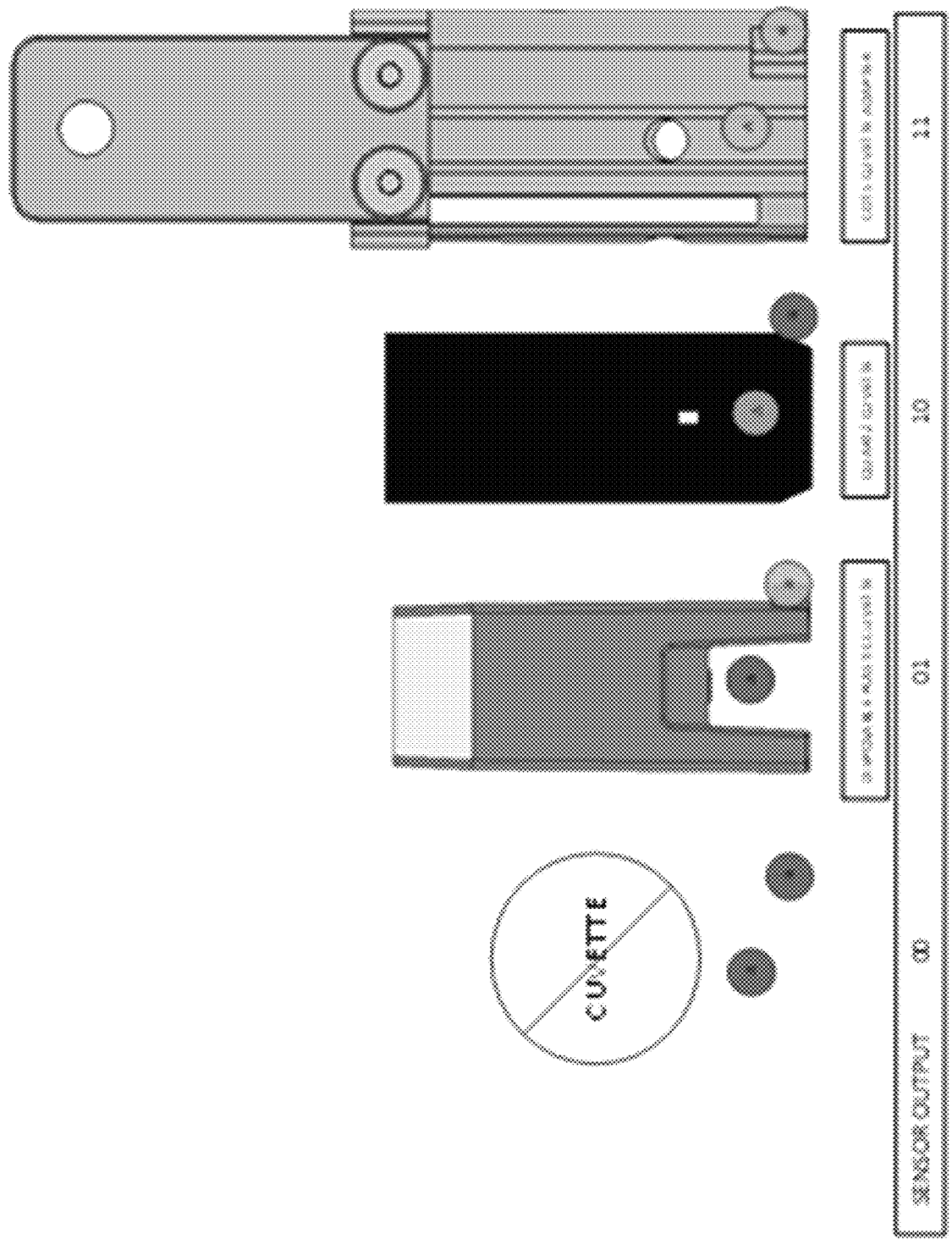
FIG. 5A depicts a cuvette detection scheme in accordance with an embodiment.
Figure 5B:
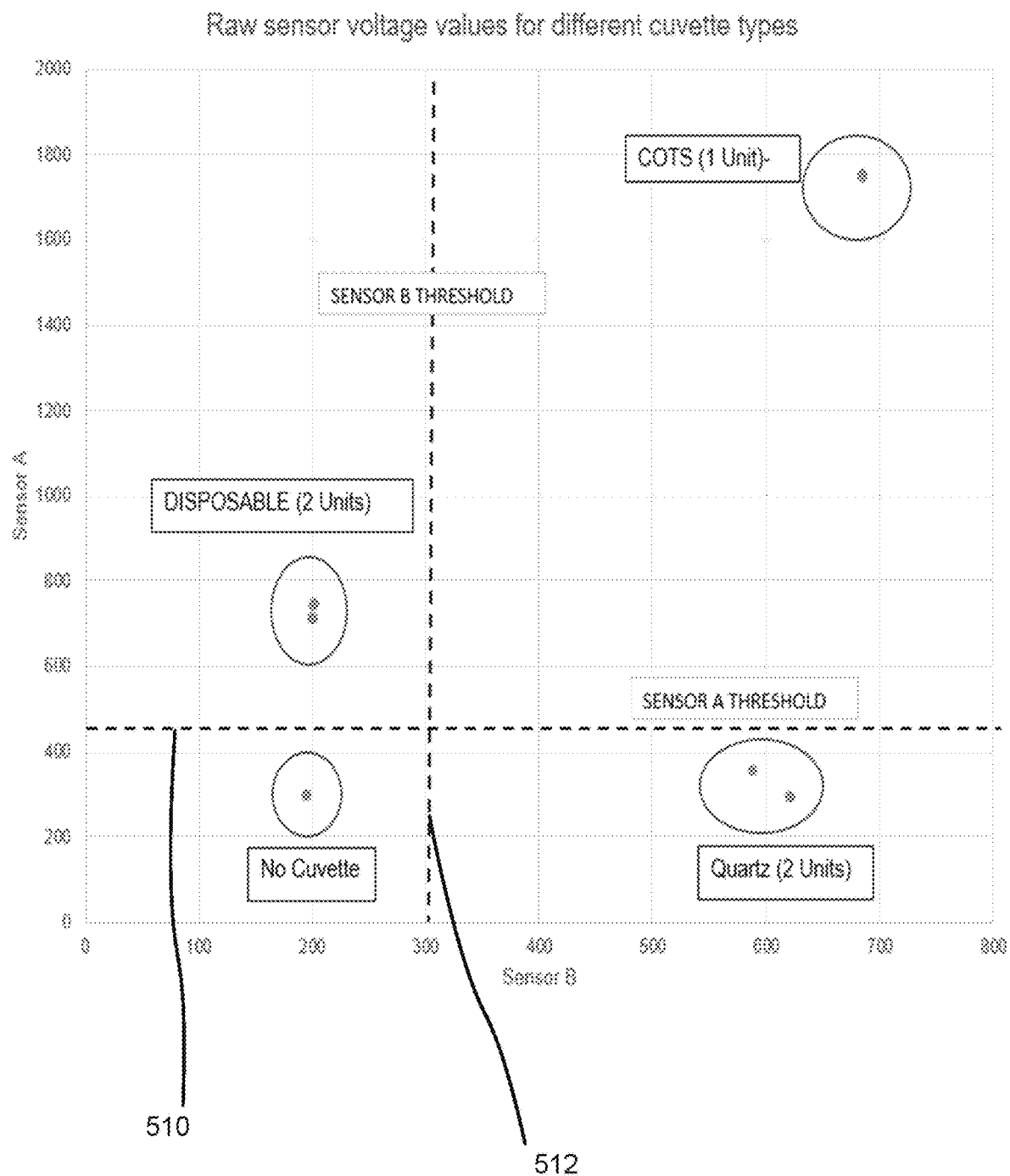
FIG. 5B depicts a graph in accordance with an embodiment.

For example, as depicted in FIG. 5A, FIG. 5B, and FIG. 5C, (a) a value of the first set of signals 520 exceeding a first sensor threshold 510 of the first sensor of 450 electronic counts could indicate the detection of a disposable cuvette or a commercial off the shelf (COTS) cuvette. Also as depicted in FIG. 5A, FIG. 5B, and FIG. 5C, a value of the second set of signals 522 exceeding a second sensor threshold 512 of the second sensor of 310 electronic count could indicate the detection of a COTS cuvette or a quartz cuvette. In addition, referring to FIG. 5A, FIG. 5B, and FIG. 5C, a value of the first set of signals 520 exceeding first sensor threshold 510 of 450 electronic counts and a value of the second set of signals 522 exceeding second sensor threshold 512 of 310 electronic counts could indicate the detection of a COTS cuvette. For example, n sensors could be used to detect $2^n$ scenarios. In an embodiment, the apparatus, computer implemented method, system, and computer program product use an array of proximity sensors 210 that trigger selectively based on the features on the cuvette they detect (based on shape) as depicted in FIG. 5A.

Computer System

In an exemplary embodiment, the computer system is a computer system 600 as shown in FIG. 6. Computer system 600 is only one example of a computer system and is not intended to suggest any limitation as to the scope of use or functionality of embodiments of the present invention. Regardless, computer system 600 is capable of being implemented to perform and/or performing any of the functionality/operations of the present invention.

Computer system 600 includes a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 612 may be described in the general context of computer system-executable instructions, such as program modules, being executed by a computer system. Generally, program modules may include routines, programs, objects, components, logic, and/or data structures that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computer system 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions/operations of embodiments of the invention.

Program/utility 640, having a set (at least one) of program modules 642, may be stored in memory 628 by way of example, and not limitation. Exemplary program modules 642 may include an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the present invention.

Computer system/server 612 may also communicate with one or more external devices 614 such as a keyboard, a pointing device, a display 624, one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A light scattering apparatus comprising:
   at least one sensor configured to detect at least one shape feature of a cuvette,
      wherein the cuvette is configured to contain a sample and includes a sample chamber constructed and arranged to receive a source of light, wherein the at least one sensor is below the sample chamber,
      wherein the at least one sensor is located a distance from a receptacle configured to contain the cuvette;
   a light source that outputs the source of light to the sample chamber during a light scattering measurement of the sample; and
   an insulating block configured to maintain a temperature of the at least one sensor within an operating temperature range of the at least one sensor during the light scattering measurement of the sample, wherein the at least one sensor is configured to be non-operational during the light scattering measurement of the sample.

2. The apparatus of claim 1 wherein the at least one sensor comprises an optical sensor.

3. The apparatus of claim 2 wherein the optical sensor is directed to the at least one shape feature.

4. The apparatus of claim 1 wherein the distance ranges from 2 mm to 30 mm.

5. The apparatus of claim 4 wherein the distance is 16.5 mm.

6. The apparatus of claim 1 wherein the temperature range is −40 degrees C. to 120 degrees C.

7. The apparatus of claim 1 wherein the at least one sensor is within a light channel directed to the at least one shape feature.

8. The apparatus of claim 1 wherein the at least one sensor is adjacent to a light channel directed to the at least one shape feature.

9. The apparatus of claim 1 wherein the at least one sensor is adjacent to a light pipe directed to the at least one shape feature.

10. The apparatus of claim 1 wherein the receptacle comprises at least one leak channel configured to collect leaked fluid and configured to direct the leaked fluid to waste.

11. The apparatus of claim 1 wherein the at least one sensor is configured to be non-operational during a light scattering measurement of the sample.

12. The apparatus of claim 1 wherein the at least one sensor is mounted on a printed circuit board assembly.

13. The apparatus of claim 12 wherein the printed circuit board assembly comprises a conformal coating to prevent moisture from damaging electronics in the at least one sensor.

14. The apparatus of claim 13 wherein the printed circuit board assembly further comprises a relative humidity sensor to detect a humidity level beyond a limit.

15. The apparatus of claim 12 wherein the printed circuit board assembly is connected to the insulating block.

16. A method comprising:
   receiving, by a computer system, a first set of signals from a first sensor directed to a cuvette, wherein the cuvette is configured to contain a sample and includes a sample chamber constructed and arranged to receive from a light source a source of light during a light scattering operation that includes a light scattering measurement of the sample, wherein the first sensor is below the sample chamber and the light source, and wherein the first sensor is configured to be non-operational during the light scattering measurement of the sample;
   receiving, by the computer system, a second set of signals from a second sensor directed to the cuvette; and
   executing, by the computer system, a set of logical operations detecting a shape feature of the cuvette in response to at least one of
      a value of the first set of signals exceeding a first sensor threshold of the first sensor,
      a value of the second set of signals exceeding a second sensor threshold of the second sensor, and
      a value of the first set of signals exceeding the first sensor threshold and a value of the second set of signals exceeding the second sensor threshold.

17. The method of claim 16 wherein the signals in the first set of signals are a function of an angle of a surface of the cuvette with respect to the first sensor, reflectivity of the cuvette, and a distance of the first sensor to the cuvette.

18. The method of claim 16 wherein the signals in the second set of signals are a function of an angle of a surface of the cuvette with respect to the second sensor, reflectivity of the cuvette, and a distance of the second sensor to the cuvette.

19. A light scattering system comprising:
   a memory; and
   a processor in communication with the memory, the processor configured to perform a method comprising:
      receiving a first set of signals from a first sensor directed to a cuvette, wherein the cuvette is configured to contain a sample and includes a sample chamber constructed and arranged to receive from a light source a source of light during a light scattering operation that includes a light scattering measurement of the sample, wherein the first sensor is below the sample chamber and the light source, and wherein the first sensor is configured to be non-operational during the light scattering measurement of the sample;
      receiving a second set of signals from a second sensor directed to the cuvette, and
      executing a set of logical operations detecting a shape feature of the cuvette in response to at least one of
         a value of the first set of signals exceeding a first sensor threshold of the first sensor,
         a value of the second set of signals exceeding a second sensor threshold of the second sensor, and
         a value of the first set of signals exceeding the first sensor threshold and a value of the second set of signals exceeding the second sensor threshold.

20. A computer program product comprising a non-transitory computer readable storage medium having program instructions embodied therewith, the program instructions executable by a processor to cause the processor to perform a method comprising:
  receiving a first set of signals from a first sensor directed to a cuvette, wherein the cuvette is configured to contain a sample and includes a sample chamber constructed and arranged to receive from a light source a source of light during a light scattering operation that includes a light scattering measurement of the sample, wherein the first sensor is below the sample chamber and the light source, and wherein the first sensor is configured to be non-operational during the light scattering measurement of the sample;
  receiving a second set of signals from a second sensor directed to the cuvette; and
  executing a set of logical operations detecting a shape feature of the cuvette in response to at least one of
    a value of the first set of signals exceeding a first sensor threshold of the first sensor,
    a value of the second set of signals exceeding a second sensor threshold of the second sensor, and
    a value of the first set of signals exceeding the first sensor threshold and a value of the second set of signals exceeding the second sensor threshold.

* * * * *